J. ROSS.
NON-SIPHONING TRAP.
APPLICATION FILED APR. 18, 1919.
1,327,116.
Patented Jan. 6, 1920.
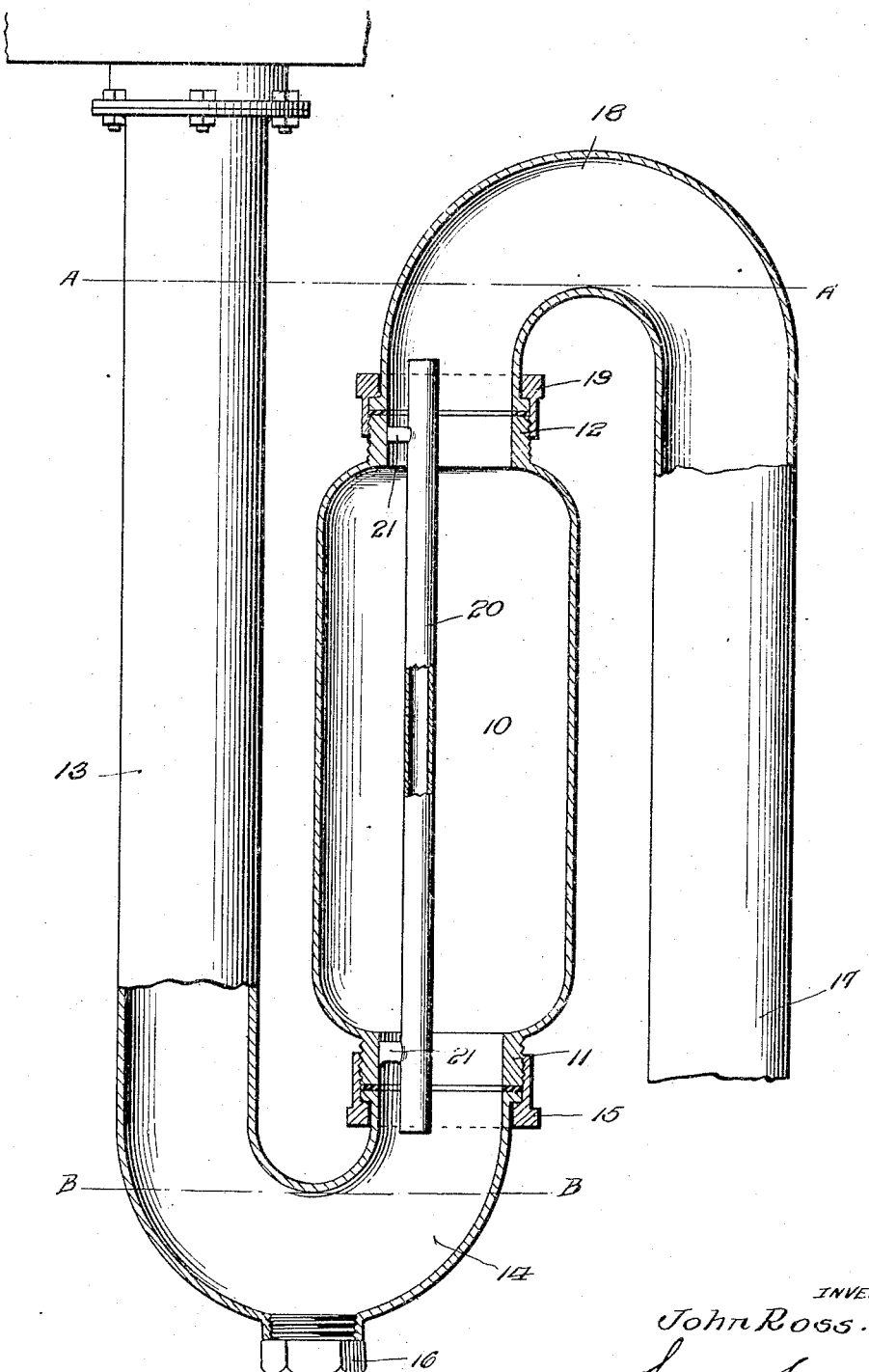
INVENTOR
John Ross.
by Lacey & Lacey,
Atty's.

UNITED STATES PATENT OFFICE.

JOHN ROSS, OF IRONWOOD, MICHIGAN, ASSIGNOR OF ONE-HALF TO LOUIS J. KUTIL, OF IRONWOOD, MICHIGAN.

NON-SIPHONING TRAP.

1,327,116.      Specification of Letters Patent.      Patented Jan. 6, 1920.

Application filed April 18, 1919. Serial No. 290,919.

*To all whom it may concern:*

Be it known that I, JOHN ROSS, citizen of the United States, residing at Ironwood, in the county of Gogebic and State of Michigan, have invented certain new and useful Improvements in Non-Siphoning Traps, of which the following is a specification.

This invention relates to an improved non-siphoning trap with an inside vent and has as one of its principal objects to provide a trap which will always normally be closed by a water seal.

The invention has as a further object to provide a trap wherein, when the water seal in the trap is subjected to the influence of a partial vacuum in the discharge pipe of the trap, the trap will be automatically vented for thus breaking the vacuum so as to prevent the seal of water from being withdrawn from the trap.

And the invention has as a still further object to provide a trap which will be meritoriously simple in construction and which will be well adapted for general use.

Other and incidental objects will appear hereinafter.

The figure of the drawing is a fragmentary side elevation of my improved trap, parts being broken away and illustrated in section in order to clearly show the structural details of the invention.

In carrying the invention into effect, I employ a cylindrical trap body or barrel 10 formed at its ends with nipples 11 and 12 respectively. Communicating with the trap body at its lower end is an inlet pipe 13 provided with an elbow 14 detachably connected with the nipple 11 by a coupling nut 15. In said elbow is a clean out plug 16. The pipe 13 may, as conventionally suggested in the drawing, be connected at its upper end with a sink. However, it may be observed in this connection that, as will presently appear, the trap of the present invention is well adapted for general use. Communicating with the trap body at its upper end is a discharge pipe 17 provided with an elbow 18 detachably connected with the nipple 12 by a coupling nut 19. Extending through the trap body is a vertical eccentrically located vent pipe 20 of a diameter much smaller than the diameter of the trap body. The vent pipe 20 is supported by webs 21 connecting opposite end portions of the pipe with the nipples 11 and 12 of the trap body. These webs may be of solder. As will be noted, the vent pipe 20 extends, at its lower end, below the nipple 11 but terminates above the upper side of the elbow 14 while, at its upper end, this pipe extends above the nipple 12 but terminates below the lower side of the elbow 18. The pipe 17 is, of course, designed for connection with a main waste pipe or stack.

Under ordinary conditions, the trap will, of course, stand full of water to the level of the dotted line A—A. However, assuming the trap to be subjected to the influence of a partial vacuum communicated through the pipe 17, it will be seen that the water in the trap will be drawn upwardly and outwardly through the trap body until the lower end of the vent pipe 20 is uncovered. Owing to the relatively small area of this pipe, the water therein will then immediately be drawn up out of said pipe when air from the pipe 13 will flow through the vent pipe for breaking the partial vacuum in the pipe 17. The water remaining at this moment in the trap body will then flow back into the elbow 14 to stand at or above the level of the dotted line B—B and form a seal closing the trap. In this connection, it is to be observed that since the vent pipe terminates at its upper end below the lower side of the elbow 18, the water drawn through the vent pipe will, instead of being drawn out through the pipe 17, flow back through the trap body for augmenting the seal of water in the elbow 14. Furthermore, since the vent pipe terminates at its lower end above the upper side of the elbow 14, water cannot be drawn through the vent pipe for breaking the seal in the elbow. When the trap is next again subjected to the influence of a partial vacuum in the pipe 17, the seal of water in the elbow 14 will be lifted up into the trap body. As soon as the water rises above the level of the lower end of the vent pipe, the water in the vent pipe will be drawn therethrough for again venting the trap when the water in the trap body will flow back into the elbow 14 to again form a seal closing the trap. I accordingly provide a trap wherein siphoning of a seal of water out of the trap will be prevented so that the trap will always normally be closed. Furthermore, as will be appreciated, the trap is of particularly simple construction and may be easily installed.

Having thus described the invention, what is claimed as new is:

1. In a trap of the character described, a barrel having nipples at its ends adapted for connection with inlet and outlet elbows, and a vent pipe extending straight through the barrel at said nipples and supported in place within the latter.

2. In a trap of the character described, an upright tubular barrel, inlet and outlet elbows, means connecting them with opposite ends of the barrel, and a straight vent pipe extending longitudinally through the barrel and both connecting means and into the elbows, its area being substantially less than that of any other part.

3. A trap of the character described including a cylindrical body, inlet and outlet elbows communicating with opposite ends of the body, and a vent pipe extending longitudinally through the body and beyond its ends and terminating at its lower end above the upper side of the inlet elbow and at its upper end below the lower side of the outlet elbow.

4. A trap of the character described including reversely disposed elbows whose inner legs aline and whose outer legs are connected respectively with inlet and discharge pipes, a barrel having nipples at its extremities connected with said alined legs, a relatively small vent pipe extending through the barrel at said nipples and webs in said nipples supporting the vent pipe.

In testimony whereof I affix my signature.

JOHN ROSS. [L. S.]